US011459001B2

(12) United States Patent
Nies et al.

(10) Patent No.: US 11,459,001 B2
(45) Date of Patent: Oct. 4, 2022

(54) LEVEL CONTROL SYSTEM FOR A VEHICLE, IN PARTICULAR A RAIL VEHICLE

(71) Applicant: KNORR-BREMSE SYSTEME FÜR SCHIENENFAHRZEUGE GMBH, Munich (DE)

(72) Inventors: Eduard Nies, Puchheim (DE); Ulrich Wermund, Munich (DE); Reinhard Loebner, Munich (DE); Jürgen Muhr, Munich (DE); Martin Lehmair, Munich (DE)

(73) Assignee: KNORR-BREMSE SYSTEME FÜR SCHIENENFAHRZEUGE GMBH ( * ) Notice: Subject to any disclaimer, the term of this patent is extended or adjusted under 35 U.S.C. 154(b) by 284 days.

(21) Appl. No.: 16/603,764

(22) PCT Filed: Apr. 9, 2018

(86) PCT No.: PCT/EP2018/058968
§ 371 (c)(1),
(2) Date: Oct. 8, 2019

(87) PCT Pub. No.: WO2018/189072
PCT Pub. Date: Oct. 18, 2018

(65) Prior Publication Data
US 2020/0130714 A1 Apr. 30, 2020

(30) Foreign Application Priority Data

Apr. 11, 2017 (DE) ..................... 10 2017 107 798.7

(51) Int. Cl.
B61F 5/06 (2006.01)
B61F 1/14 (2006.01)
(Continued)

(52) U.S. Cl.
CPC ................. *B61F 5/06* (2013.01); *B61F 1/14* (2013.01); *B61F 5/10* (2013.01); *B61F 5/144* (2013.01);
(Continued)

(58) Field of Classification Search
CPC .... B61F 1/14; B61F 5/06; B61F 5/122; B61F 5/245; B61F 5/02; B61F 5/04; B61F 5/12;
(Continued)

(56) References Cited

U.S. PATENT DOCUMENTS 3,831,901 A * 8/1974 Williams .............. F15B 15/261
254/93 R
3,860,098 A * 1/1975 Porter .................... B60N 2/929
188/300
(Continued)

FOREIGN PATENT DOCUMENTS

DE 102006027388 A1 1/2007
DE 102015016024 A1 6/2016
(Continued)

OTHER PUBLICATIONS

International Search Report corresponding to PCT/EP2018/058968 dated Jul. 31, 2018.

*Primary Examiner* — Zachary L Kuhfuss
*Assistant Examiner* — Cheng Lin
(74) *Attorney, Agent, or Firm* — Barnes & Thornburg LLP

(57) ABSTRACT

A level control system for a vehicle, in particular a rail vehicle, includes at least one level control cylinder and one level control piston, the level control piston being movably guided in the level control cylinder in order to adjust the level of the rail vehicle, the level control piston having an outer piston sleeve and a piston main body at least partially
(Continued)

accommodated in the piston sleeve, and the piston main body being slidable relative to the piston sleeve for wear readjustment and being lockable and/or fixable in at least two adjustment positions.

17 Claims, 6 Drawing Sheets

(51) Int. Cl.
  *F15B 15/26* (2006.01)
  *B61F 5/22* (2006.01)
  *F15B 15/16* (2006.01)
  *B61F 5/14* (2006.01)
  *B61F 5/10* (2006.01)

(52) U.S. Cl.
  CPC .............. *B61F 5/22* (2013.01); *F15B 15/16* (2013.01); *F15B 15/261* (2013.01); *B61F 5/148* (2013.01)

(58) Field of Classification Search
  CPC ...... B61F 5/16; B61F 5/20; B61F 5/22; B61F 5/10; B61F 5/144; B61F 5/148; F15B 15/261; F15B 15/1457; F15B 2015/1495; F15B 15/16; F15B 15/24; F15B 15/26; F15B 15/264
  See application file for complete search history.

(56) References Cited

U.S. PATENT DOCUMENTS

| | | | | |
|---|---|---|---|---|
| 3,874,307 A | * | 4/1975 | Schwam | B61F 5/127 105/198.3 |
| 4,474,267 A | * | 10/1984 | Empson | B61F 5/06 105/198.1 |
| 5,341,724 A | * | 8/1994 | Vatel | F15B 15/16 91/1 |
| 7,243,606 B2 | * | 7/2007 | Hommen | B60G 17/02 105/453 |
| 7,520,494 B2 | * | 4/2009 | Gaile | B60G 17/01933 188/322.21 |
| 9,315,203 B2 | * | 4/2016 | Franks | B61F 5/02 |
| 9,440,826 B2 | * | 9/2016 | Prisk | B66F 3/30 |
| 10,578,135 B2 | * | 3/2020 | Fuhrmann | B66F 3/28 |
| 10,895,270 B2 | * | 1/2021 | Todsen | F15B 15/1457 |

FOREIGN PATENT DOCUMENTS

| | | |
|---|---|---|
| EP | 1391331 A2 | 2/2004 |
| EP | 1874571 B1 | 6/2012 |

* cited by examiner

LEVEL CONTROL SYSTEM FOR A VEHICLE, IN PARTICULAR A RAIL VEHICLE

CROSS REFERENCE AND PRIORITY CLAIM

This patent application is a U.S. National Phase of International Patent Application No. PCT/EP2018/058968 filed Apr. 9, 2018, which claims priority to German Patent Application No. German 10 2017 107 798.7 filed Apr. 11, 2017, the disclosures of which are incorporated herein by reference in their entirety.

FIELD

The presently disclosed embodiments relate to a level control system for a vehicle, in particular a rail vehicle with at least one hydraulically actuatable level control cylinder and a level control piston, wherein the level control cylinder is movably guided in the level control piston to the adjust the level of the rail vehicle.

BACKGROUND

Level control systems for rail vehicles are already known from the prior art, by means of which the height between the chassis and the wagon body can be adjusted for level control of the wagon body of the rail vehicle.

SUMMARY

Disclosed embodiments provide a level control system for a vehicle, in particular a rail vehicle, with at least one level control cylinder and a level control piston, wherein the level control piston is movably guided in the level control cylinder for adjustment of the level of the rail vehicle, wherein the level control piston comprises an outer piston sleeve and a piston base body at least partially accommodated in the piston sleeve, and wherein the piston base body is movable relative to the piston sleeve for readjustment and can be established and/or fixed in at least two adjustment positions.

BRIEF DESCRIPTION OF THE FIGURES

Further details and advantages of the disclosed embodiments will now be explained in more detail based on the drawings.

In the figures.

DETAILED DESCRIPTION

Figure 1:
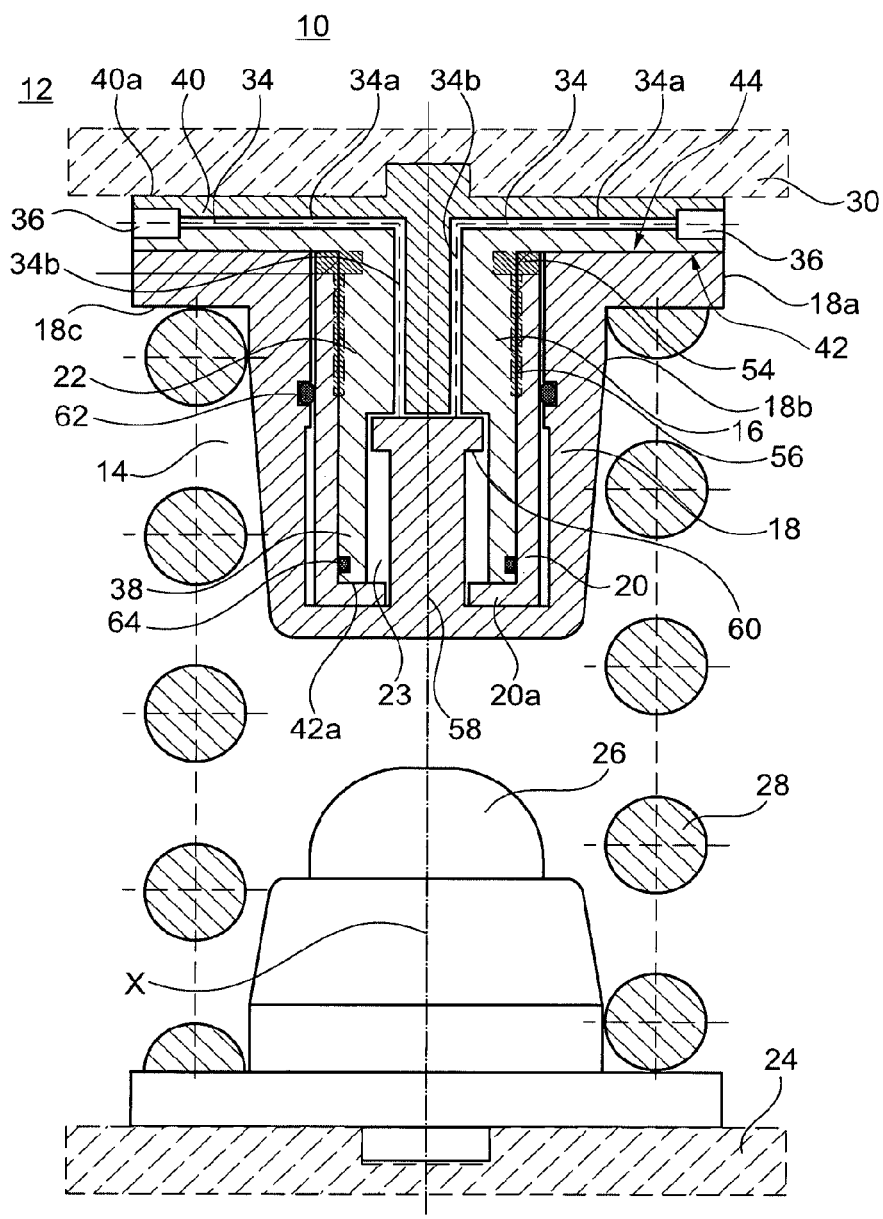
FIG. 1 shows an embodiment of a level control system according to the disclosed embodiments with a fully retracted level control cylinder, in the case of an empty vehicle and non-worn wheel rims.

DE 10 2015 016 024 A1 discloses a spring system of a rail vehicle with a strut for arrangement between the bogie and the wagon body of the rail vehicle that is already known, wherein the strut comprises a cylinder and a piston movably accommodated in the cylinder that bounds piston chambers below and above the piston head, wherein the piston or cylinder is directly or indirectly connected to the bogie and the other of the components is directly or indirectly connected to the wagon body, and with a spring arranged in such a way that it cushions the wagon body relative to the bogie, wherein the spring system comprises a hydraulic system that is connected to at least one of the piston chambers in such a way that it can be subjected to a hydraulic medium, and wherein the piston chambers are arranged in such a way that the spring is then pulled together by the piston if there is an overpressure in the lower piston chamber compared to the upper piston chamber, wherein the spring surrounds the cylinder, that a carrying element is provided that adjoins the spring, that the piston and in particular the piston rod are arranged in such a way as to only exert a force on the carrying element if there is an overpressure in the lower piston chamber compared to the upper piston chamber.

From EP 1 874 571 B1, a device for secondary suspension for a rail vehicle is known. Secondary suspension between a wagon body and a track-bound bogie of a rail vehicle is used in particular for additional vibration insulation of the wagon body in order to enable a comfortable ride for passenger traffic. In many cases, the secondary suspension also works together with a roll control for the wagon body. In addition to the secondary suspension for increasing comfort, a rail vehicle of the type that is of interest here also comprises a primary suspension. The primary suspension works between the wheel axles of the rail vehicle and the bogie and is primarily used to absorb hard impacts, which the rail vehicle is exposed to while travelling due to uneven rail systems and the like.

DE 103 15 000 A1 reveals a device for secondary suspension. For secondary suspension, a spring element is provided between the bogie and the wagon body that is an active hydraulic spring, a gas spring or the like or even a passive spring in the form of a steel spring embodied as a type of compression spring or similar. For the spring element, a pulling cylinder is provided between the bogie and the wagon body, with which a restoring force acting against the force of the spring element can be produced in order to move the wagon body from the raised travel level to a lowered platform level (loading/unloading position) and to hold the level. Deactivation of the pulling cylinder causes the wagon body to return to the raised travel level by the restoring force of the spring stage. The pulling cylinder is a hydraulic cylinder that is acted upon on one side. In order for the pulling effect to occur, i.e. the piston rod entering the cylinder body of the pulling cylinder when pressure medium is applied, the pressure medium is applied to the cylinder head side of the inner piston.

In particular, DE 103 15 000 A1 reveals a rail vehicle with a substructure and a wagon body arranged above it, wherein a spring stage is provided between the wagon body and the substructure, wherein at least one actuator is provided between the wagon body and the substructure that is designed to move the wagon body from an elevated driving position to a lowered loading/unloading position against a restoring force caused by the spring stage and to hold it in the loading/unloading position, wherein the wagon body is lifted to a travel position by the restoring force when the actuator is deactivated.

From U.S. Pat. No. 9,315,203 B2 a level control system for a rail vehicle is also known that can lift the wagon body of the rail vehicle by means of hydraulic cylinders. In this case, however, the hydraulic cylinders are connected to the chassis of the rail vehicle.

To the contrary, disclosed embodiments provide a level control system of a vehicle of the type mentioned above in an advantageous manner, in particular in that the level control system can be built more compactly, level adjustment of the rail vehicle is enabled and at the same time fixing in multiple positions for wear adjustment and readjustment is enabled.

Disclosed embodiments are based on the basic idea of providing an adjustable lifting height in a level control system for a vehicle, in particular a rail vehicle, and in the level control cylinder, with which the level of the vehicle relative to the ground or relative to a platform such as a station platform can be regulated. At the same time, however, an adjustment option should be provided directly, by means of which the wheel rim wear of the vehicle, in particular of the rail vehicle, but also the rail wear, can be readjusted. The possibility of level control and at the same time the possibility of readjustment and correction of the wheel rim or rail wear are directly integrated into the level control system in such a way that this enables a compact design. In particular, wear adjustment and level regulation are not arranged axially offset to each other, but parallel to each other or nested in one another. This is achieved in particular by the fact that the level control cylinder with the outer piston sleeve and the piston base body provides the element by means of which the lifting height can be adjusted for the level regulation on the one hand and wear adjustment is provided telescopically between the piston sleeve and the piston base body for this purpose. The wear adjustment is not arranged axially relative to the level control piston, but is directly integrated into the level control piston. Thus, the axial adjustment for level regulation as well as the axial adjustment for regulating and re-adjustment of the wheel rim and/or rail wear are not axially offset relative to each other, but are arranged radially offset. Readjustment may in particular be wear adjustment.

In addition, it may be provided that the level control cylinder is actuated hydraulically. Hydraulic actuation can achieve simple, safe and reliable operation of the level control cylinder. In particular, the necessary working pressures can be easily and reliably achieved even in the desired temperature ranges. In principle, however, pneumatic or electromechanical actuation or even magnetic actuation is conceivable.

It is further possible that the piston base body can be continuously displaced relative to the piston sleeve for wear adjustment. For this purpose, it is conceivable that the continuously variable displacement is achieved by hydraulic actuation, for example. In addition, it may be provided that the adjustment position is provided and set up in such a way that it allows locking in the adjustment position. This ensures that the adjustment position cannot be easily exited after being adopted. Operational safety can be increased as a result. This also simplifies the operation of the level control system.

In addition, it may be provided that the level control system also includes a secondary spring that is led around the level control cylinder and the level control piston. In particular, the secondary spring may be a coil spring. The secondary spring is in particular the usual secondary spring as used in rail vehicles as a secondary spring. The primary spring is the main spring in the chassis, whereas the secondary suspension is arranged between the chassis and the wagon body.

In addition, it may be provided that an adjustment position has at least one recess. Due to the recesses, an adjustment position can be easily and safely visited, as it is possible to establish the adjustment position safely or even to achieve it automatically.

Further, it may be provided that at least one retaining ring, in particular a snap ring, and/or at least one locking screw and/or at least one locking pin and/or at least one bayonet system and/or at least one ball, in particular a spring-loaded ball, and/or at least one magnet and/or one clamping element and/or threaded element is provided, which engages in the adjustment position for fixing. The threaded element can be, for example, a round thread or a trapezoidal thread.

For example, simple and reliable engagement can be enabled by the recess and the securing ring. It is conceivable, for example, that the securing ring is a snap ring. The snap ring can be formed at least partially elastically or spring-like, so that during a movement between two engaged positions the retaining ring is compressed on the one hand so that a simple displacement becomes possible. On reaching the engaged position and the associated recess, the retaining ring then snaps into the recess and thereby achieves the engagement. The same mechanisms can be achieved, for example, with a locking pin or a spring-loaded ball. The position can be maintained by means of the locking screw after reaching the adjustment position. For this purpose, corresponding recesses or corresponding screw-in holes for the locking screw may be provided. The recess can be provided by the threaded hole for the locking screw. A bayonet system can also be provided. It is conceivable, for example, that the bayonet system is a stepped bayonet system in which several bayonet steps are provided in succession. For this purpose, in multiple bayonet grooves arranged parallel to each other corresponding bayonet studs can engage, which can be axially shifted relative to the longitudinal axis of the piston in a corresponding guide path after leaving the bayonet grooves in order to reach a further axial groove step.

Furthermore, it may be provided that the piston base body is axially movable relative to the piston sleeve by applying pressure and/or by reducing pressure. By appropriate pressure adjustment, readjustment and displacement of the piston base body relative to the piston sleeve can be supported. For this purpose, for example, the working pressure in the system of level control pistons and level control cylinders is increased or decreased, whereby a corresponding axial adjustment can then be carried out.

In the example case of a bayonet solution, the bayonet studs are located in the bayonet path. Since the piston sleeve with the collar is in contact with the stop collar, only the piston will be lifted. Upon reaching the next bayonet step, the piston sleeve can be rotated with the bayonet studs into bayonet grooves of the next step.

In addition, it may be provided that a mechanical adjustment, in particular an adjustment screw, is accommodated or provided in and/or on the piston base body that may be located in the piston base body in at least one first position and in at least one second position, wherein a change is carried out from one adjustment position to another adjustment position by transferring the adjustment screw from the first position to the second position of the piston base body relative to the piston sleeve for wear adjustment. This transferability can also be arranged in further engagement positions or can be reversible, i.e. such that resetting is accordingly possible. The mechanical adjustment makes it easy to allow readjustment and adjustment to compensate for rim wear. By including the mechanical adjustment, in particular the adjustment screw, in the piston base body, a very compact design is also possible. This transferability can also be designed in further adjustment positions or reversibly, i.e. such that resetting is accordingly possible.

In addition, it may be provided that the piston base body has a recess into which hydraulic oil can flow. In particular, it may be provided that the recess is cylindrical or substantially cylindrical. The recess simply allows hydraulic oil to flow into the piston cylinder system consisting of a piston base body and a level control cylinder. This can then also be used to build up the pressure in order to achieve the desired lifting heights for level regulation.

In particular, it may be provided that the level regulation is carried out continuously between the respective end stops by adjusting the lifting heights. This may be limited in particular by suitable end stops between the level control cylinder and the level control piston.

It is conceivable, in particular, that a stop pin protrudes into the recess. One of the end stops for limiting the lifting height can be reached by means of the stop pin. The other end stop can be reached, for example, by an axial boundary surface of the piston and/or piston sleeve, which correspondingly contacts a further axial boundary surface of the cylinder for the maximum stop.

Furthermore, it may be provided that the stop pin has an essentially circumferential stop collar, wherein the stop collar has a larger diameter than a central opening of the piston sleeve, through which the stop pin passes in the mounted state. This also achieves captive retention between the piston and the cylinder at the same time. In particular, it is not possible to pull the piston out of the cylinder completely. The stop pin can accordingly be removably attached in the level control cylinder for correspondingly easier assembly.

In addition, it is conceivable that the hydraulic piston comprises multiple hydraulic guide channels through which the hydraulic oil can flow into the recess. By providing for multiple hydraulic guide channels, it is achieved that the system can set a different lifting height in a very short time and that the system as a whole can be operated dynamically. This is particularly interesting in connection with the planned operation, namely the lowering of the wagon body when the train enters a station platform and the reduction of the wagon body level there.

The hydraulic guide channels can be arranged in particular in the piston base body. The hydraulic guide channels can be channels that are essentially completely within the piston base body. The hydraulic guide channels can be formed, for example, by drilling.

The level control system can be a so-called push-up system. In principle, however, it is also conceivable that the level control system is a so-called pull-down system.

Furthermore, it may be provided that the hydraulic oil guide channels are arranged symmetrically relative to each other. Due to the symmetrical arrangement, a uniform inflow and the uniform build-up of the hydraulic pressure in the recess or in the piston cylinder system are achieved.

In addition, it is conceivable that the level control system has at least one stroke limit for the stroke of the level control piston with respect to the level control cylinder, in particular wherein the stroke limit has an axial distance. The axial stops may be formed, for example, by the stop pins and the walls of the level control cylinder or level control piston, in particular the piston sleeve. In particular, it is conceivable that a stop is formed by a distal axial wall of the level control piston, in particular by a distal axial wall of the piston sleeve, and the corresponding stop surface in the level control cylinder. Another stop surface is formed, for example, by the stop pin. The stop pin then accordingly engages an edge of the piston sleeve.

Furthermore, it may be provided that at least one seal, in particular a radial seal, is provided between the level control cylinder and the level control piston. It is conceivable in particular that a seal is provided on the outside of the level control piston, i.e. on the outside and inside of the level control piston sleeve and the level control cylinder. For this purpose, it may also be provided that several seals are provided. Such seals may be, for example, vulcanized radial seals, O-rings or radial sealing rings.

In addition, it may be provided that the level control piston and the level control cylinder are coaxial to each other. This simplifies the overall design and enables a compact design.

Furthermore, it may be provided that the adjustment screw is coaxial with the level control piston and the level control cylinder. This ensures that a desired level regulation can be achieved in a comparatively short time as well as the necessary lifting heights. In addition, it is achieved that a wear adjustment for the wheel rim wear is possible, not by axial offset of the corresponding elements for wear adjustment, but by radial offset. An overall telescopic structure is achieved by this.

Furthermore, it is conceivable that the secondary spring is coaxial with the level control piston and the level control cylinder. This achieves an overall compact structure of the level control system.

Furthermore, in this context it is also conceivable that the emergency spring is arranged within the secondary spring and also coaxial with the secondary spring and the level control piston.

The level control system may have a connection to the wagon body or other components attached to the wagon body (e.g. a layer spring), wherein the connection to the wagon body can be implemented on the level control piston. This enables an optimal design of the level control system and utilization of the installation space. In addition, it facilitates arranging the hydraulic connections near the wagon body for the level control system and providing the hydraulic supply accordingly.

With this understanding of the technical utility of the disclosed embodiments in mind, FIG. 1 shows in schematic sectional representation a level control system 10 according to the disclosed embodiments for a rail vehicle 12. The level control system 10 comprises a hydraulically actuatable level control cylinder module 14. The level control cylinder module 14 comprises a level control piston 16 and a level control cylinder 18. The level control piston 16 is movably guided in the level control cylinder 18 for adjustment of the level of the rail vehicle 12. Further, the level control piston 16 comprises an outer piston sleeve 20 and a piston base body 22 at least partially accommodated in the piston sleeve 20. Furthermore, the chassis 24 is shown as part of the level control system 10. The emergency spring 26, which at the same time also guides the compression spring or the secondary spring 28 or on which the secondary spring 28 rests, is arranged on the chassis 24.

The emergency spring 26, the secondary spring 28 as well as the level control cylinder module 14 with the level control piston 16 and the level control cylinder 18 are aligned coaxially overall relative to the longitudinal axis of the level control piston 16 and the level control cylinder 18. In other words, all of these coaxial elements have a common imaginary longitudinal axis. This common longitudinal axis is referred to in FIG. 1 with the reference character X. The level control cylinder module 14 is attached directly to the wagon body 30 or components of the wagon body. The level control system 10 thus has a connection to the wagon body, wherein the connection to the wagon body is implemented on the level control piston 16.

Hydraulic oil guide channels 34 are provided in the piston base body 22. The hydraulic oil guide channels 34 each comprise hydraulic connections 36 and are initially arranged horizontally in the orientation shown. The hydraulic oil guide channels 34 are formed in the piston base body 22 by drilling. The horizontal sections of the hydraulic oil guide channels 34 are denoted by the reference character 34*a*, the vertical sections by the reference character 34*b*. The piston base body 22 is further embodied in a hat-like form, i.e. it comprises a cylindrical first section 38 with a smaller diameter than a second section 40 that extends radially further outward and contacts the car box 30 directly with its outer surface 40*a*. The radial stop surface 42 of the piston base body 22, which faces away from the wagon body 30, serves as a stop surface 42 for the level control cylinder 18, which comprises a corresponding counter surface 44 on a flange-like section 18*a*.

Alternatively, the lower end of the piston sleeve 20*a* can also serve as a stop surface, which is then in contact with the bottom of the cylinder with the stop surface 20*b*. The level control cylinder 18 comprises on its outside a cylindrical guide surface 18*b* and an axial contact surface 18*c* for the secondary spring 28. The piston sleeve 20 accommodates the piston base body 22 and envelopes the piston base body 22 at its distal end, i.e. the end of the piston base body 22 facing away from the wagon body 30 and that turns radially inwards.

The piston sleeve 20 comprises for this purpose an annular inwardly facing wall 20*a*, which comprises an axial stop surface 42*a* for the distal end of the piston base body 22.

The piston base body 22 comprises a recess 23, which is located inside the piston base body 22 and which is formed as a cylindrical recess 23 coaxial with the longitudinal axis of the piston base body 22.

The hydraulic oil guide channels 34 lead to the recess 23. The hydraulic oil guide channels 34 are formed symmetrically relative to each other. In this case, the portions of the hydraulic oil guide channels 34 opening in the recess 23 are arranged substantially parallel to the longitudinal axis and in the second flange-like section 40 of the piston base body 22 are arranged substantially perpendicular thereto. The piston base body 22 is movable relative to the piston sleeve 20 for wear adjustment and comprises several engagement positions 46, 48, 50, 52 (see also FIG. 4).

In this case, each of the adjustment positions or engagement positions 46, 48, 50, 52 comprises a recess 46*a*, 48*a*, 50*a*, 52*a*. The recess 46*a*, 48*a*, 50*a*, 52*a* may be provided only in the piston sleeve 20 or only in the piston base body 22.

Figure 4:
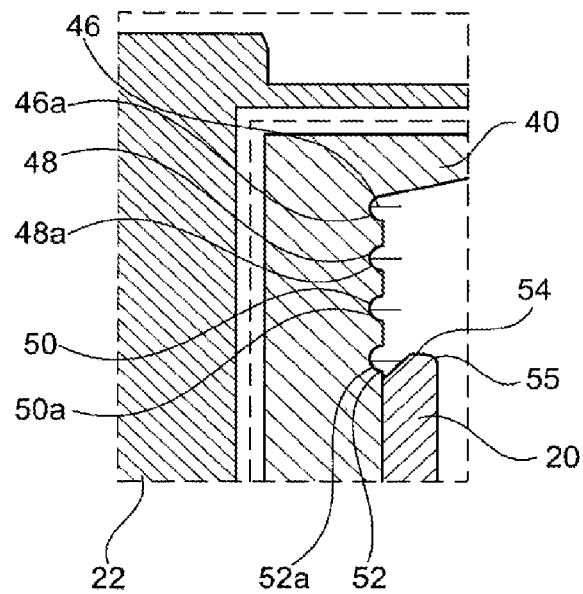
FIG. 4 shows a detailed presentation of the wear adjustment of the level control system shown in FIG. 1.

In the exemplary embodiment shown according to FIG. 1 and FIG. 4 the recess 46*a*, 48*a*, 50*a*, 52*a* is present only as a recess 46*a*, 48*a*, 50*a*, 52*a* on the piston base body 22.

In addition, a snap ring 54 is provided, which serves as a securing ring and accordingly snaps into the respective set recess 46*a*, 48*a*, 50*a*, 52*a* and causes an engagement there. In FIG. 4 the snap ring sits in the recess 52*a* of the engagement position 52 in the situation shown.

The snap ring 54 is essentially arranged in a wedge gap 55 between the piston sleeve 20 and the piston base body 22. The wedge gap 55 is formed essentially by an inclined surface or chamfering in the piston sleeve 20. This allows the snap ring 54 to slide out of the recesses 46*a*, 48*a*, 50*a*, 52*a* on the one hand, but at the same time enables secure fixing of the snap ring in the adjustment position and recess.

For the purpose of wear adjustment, a mechanical adjusting means 56 is provided, which is arranged in the piston base body 22 (only shown schematically). The adjusting means 56 can take several positions and can be used, for example, for the rotary and axial adjustment of the piston sleeve 20 and piston base body 22, wherein, by transferring the adjusting screw 56 from a first position to a second position, the piston base body 22 is transferred relative to the piston sleeve 20 from one engagement position 46, 48, 50, 52 to another engagement position 46, 48, 50, 52 for wear adjustment.

A reversible adjustment between the engagement positions 46, 48, 50, 52 is possible in each case. A stop pin 58 is provided in the bottom of the level control cylinder 18 that protrudes into the recess of the piston base body in the mounted state 22.

The stop pin 58 comprises an essentially circumferential stop collar 60, wherein the stop collar 60 has a larger diameter than the central opening of the piston sleeve 20, which the stop pin 58 passes through in the mounted state.

It is conceivable that the stop pin 58 is formed in multiple parts, wherein the stop pin is partially formed in one part on the level control cylinder 18. A part of the stop pin 58, for example, can be reversibly mounted on a stop pin base body, e.g., the stop collar 60.

The radially outer surface of the stop collar 60 of the stop pin 58 is spaced apart from the cylindrical wall of the recess, whereby a gap is formed in which the hydraulic oil can flow.

The stop collar 60 forms an axial stop, likewise the bottom of the level control cylinder 18. These two axial stops limit the maximum lifting height available for level control.

The function of the level control system 10 can be described as follows:

In the state shown in FIG. 1, the level control system 10 is fully retracted. Also, a readjustment to compensate for the wear of the wheel rims has not been carried out here. In other words, the level control piston 16 is fully retracted into the level control cylinder 14.

Further, the piston sleeve 20 is arranged relative to the piston base body 22 so that the level control piston 16 has the smallest possible axial extent or length. This state is observed for an empty vehicle (in particular, it should be noted that the level control cylinder 14 does not rest on the emergency spring 26 and the secondary spring 28 is not fully compressed) as well as for non-worn wheel rims. The deployment of the level control piston 16 from the level control cylinder 14 is carried out by hydraulic actuation and by the inflow of hydraulic oil into the recess 23 via the hydraulic oil guide channels 34. The retraction is carried out accordingly by an outflow or removal of hydraulic oil from the recess 23 via the hydraulic oil guide channels 34. The hydraulic pressure chamber, which is formed between the level control piston 16 and the level control cylinder 14, in particular in the recess 23, is bounded in a sealed manner by radial seals, here an O-ring 62 between the piston sleeve 20 and the level control cylinder 14 and an O-ring 64 between the piston sleeve 20 and the piston base body 22.

Figure 2:
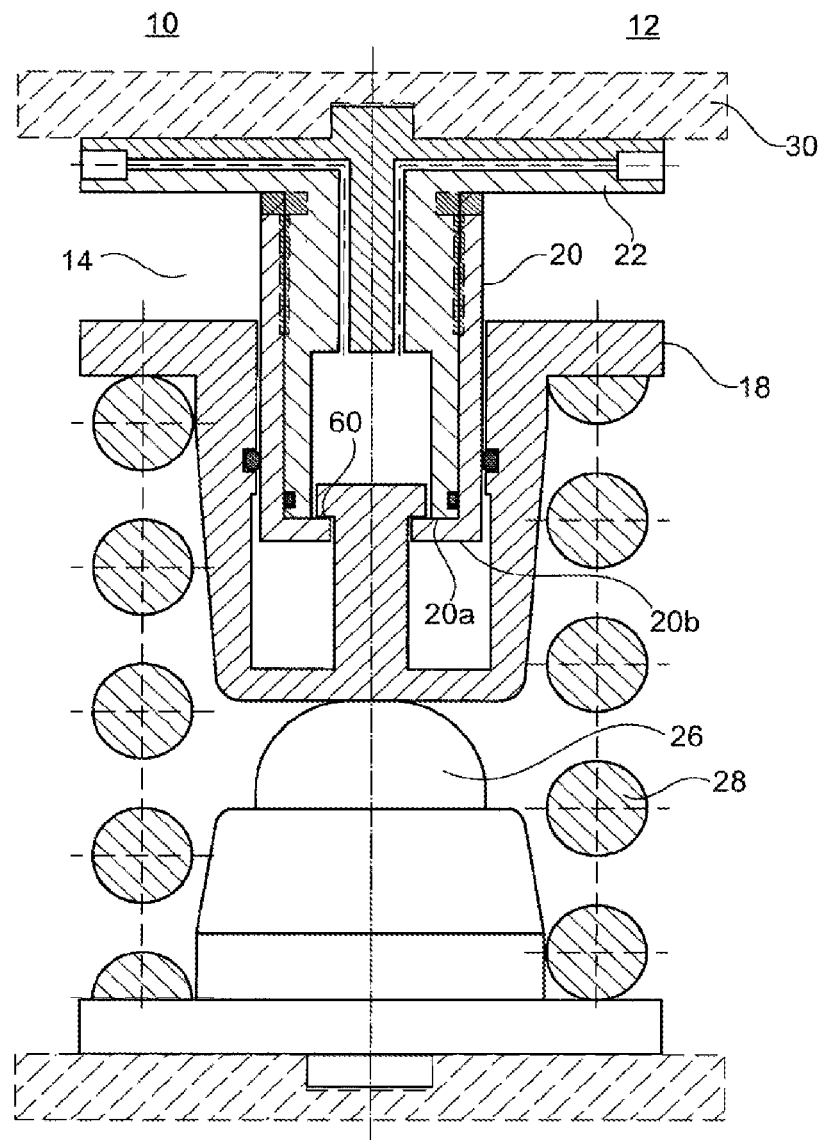
FIG. 2 shows a further schematic sectional representation of the exemplary embodiment shown in FIG. 1 in the case of an extended hydraulic level control cylinder for a fully loaded vehicle and non-worn wheel rims.

FIG. 2 shows in a schematic sectional representation the exemplary embodiment of the level control system 10 shown in FIG. 1 with the level control cylinder 18 extended for a fully loaded rail vehicle 12 and non-worn wheel rims (not shown in more detail). The wear adjustment is not activated here, i.e., the piston sleeve 20 is not extended relative to the piston base body 22, but is in a fully retracted state, which represents the state for non-worn wheel rims. Here, the distal end of the piston base body 22 is contacting the annular, inwardly facing wall 20a. However, with the level control cylinder module 14 fully extended, the wall 20a is adjacent to the stop collar 60, i.e., the maximum lifting height of the level control cylinder 18 is reached here.

In this case, the outer axial surface of the level control cylinder 18 is also in contact with the emergency spring 26. At the same time, the secondary spring 28 is fully compressed. This compression can be compensated by the additional lifting height provided by the level control cylinder module 14. The same applies to level differences between the wagon body 30 and a station platform edge, which can be compensated in this way.

Figure 3:
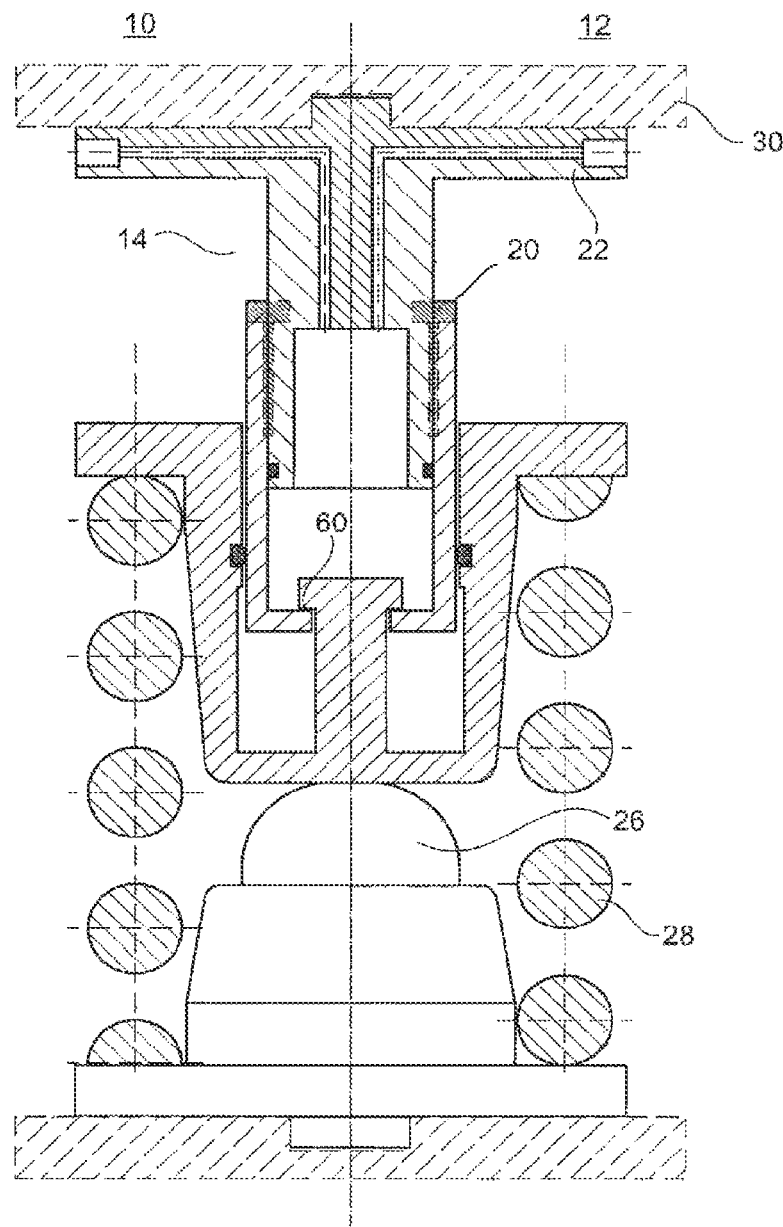
FIG. 3 shows a further view of the level control system shown in FIG. 1, but here with an extended hydraulic level control cylinder and readjustment of the wheel rim wear (fully extended wear adjustment) in the case of a fully loaded vehicle and fully worn wheel rims.

FIG. 3 shows a comparable situation as in FIG. 2, only with the difference that here the wheel rims are completely worn. In this respect, an additional wear adjustment must be carried out, which is done by extending the total length of the piston in its axial measurement such that the piston sleeve 20 is extended relative to the piston base body 22.

This is carried out in the case shown by means of the adjustment positions provided, which can be secured accordingly in each case, for example by a snap ring 54, as already described above and shown in detail in FIG. 4. Alternatively, securing with a locking screw, trapezoidal thread or a stepped bayonet solution is also conceivable.

Figure 5:
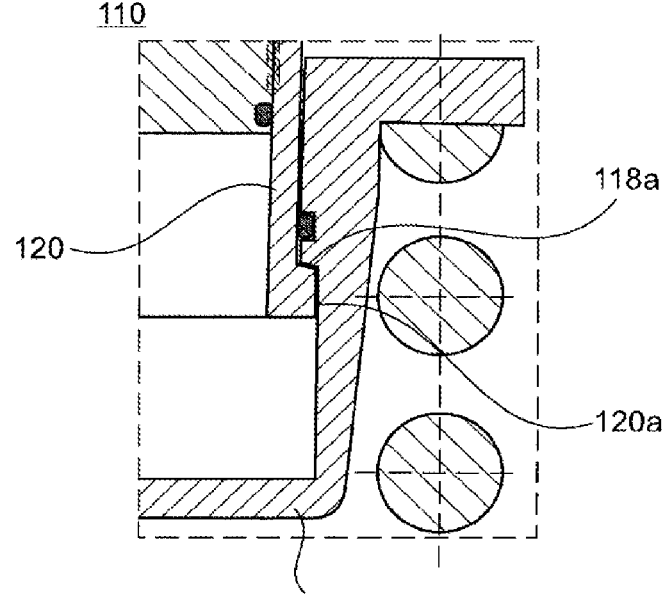
FIG. 5 shows a schematic detailed representation of another possible embodiment with a radially external stop for the piston sleeve.

FIG. 5 shows a schematic detailed representation of another possible embodiment of a level control system 110. The level control system 110 comprises all the structural and functional characteristics as the level control system 10 described above in connection with FIG. 1 through FIG. 4.

Comparable or identical features are given a reference character that is increased by 100 compared to the reference characters referred to in FIG. 1 through FIG. 4.

One difference, however, is that here a radially outer stop 120a is provided for the piston sleeve 120, which can stop on a protrusion 118a of the level control cylinder 118.

Figure 6:
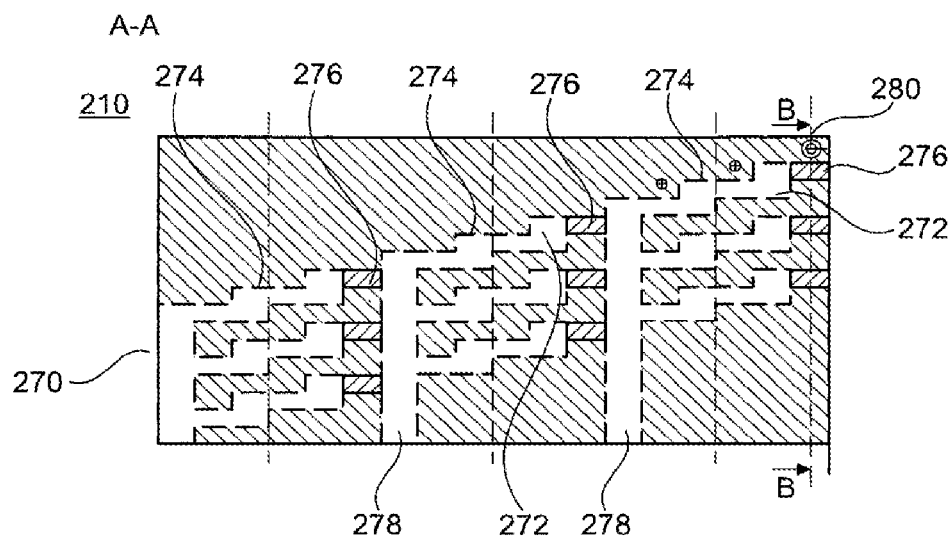
FIG. 6 shows a detailed presentation of a possible system for wear adjustment in the form of a stepped bayonet.
Figure 7:
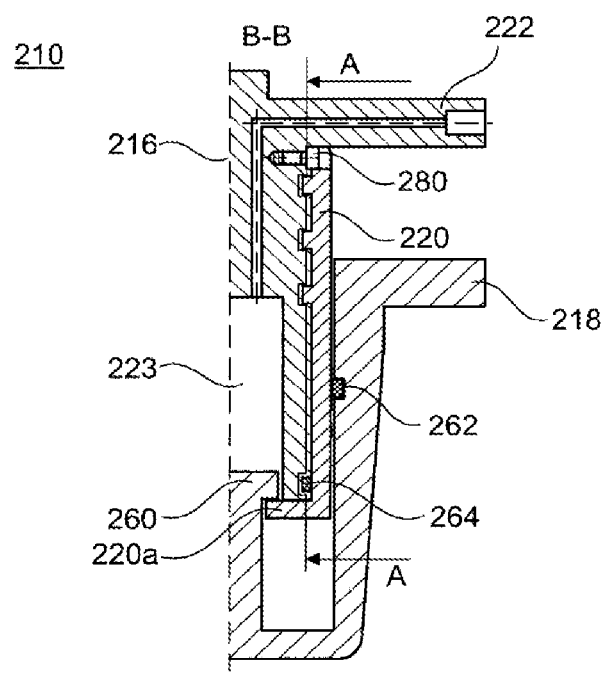
FIG. 7 shows the wear adjustment with a securing screw in connection with the stepped bayonet in accordance with FIG. 6.

FIG. 6 shows a detailed representation of a possible system for wear adjustment in the form of a stepped bayonet for a further embodiment of a level control system 210 (section A-A according to FIG. 7).

The level control system 210 comprises all the structural and functional characteristics of the level control system 10 described above in connection with FIG. 1 through FIG. 4. Comparable or identical features are given a reference character which is increased by 200 compared to the reference characters referred to in FIG. 1 through FIG. 4.

One difference, however, is that a bayonet system 270 is provided here.

The bayonet system 270 is a stepped bayonet system in which several bayonet steps 272 are arranged consecutively. For this purpose, corresponding bayonet studs 276 can engage in multiple bayonet grooves 274 arranged parallel to each other, wherein after leaving the bayonet grooves 274 the bayonet studs 276 can be moved in a corresponding guide path 278 axially related to the longitudinal axis of the level control piston 216 to reach another bayonet step 272.

The offset of the bayonet steps 272 relative to each other allows wear adjustment and adjustment of the piston sleeve 220 relative to the piston base body 222. It may be provided in this context that the piston base body 222 is axially movable relative to the piston sleeve 220 by applying pressure or reducing pressure. By appropriate pressure adjustment, readjustment and movement of the piston base body 222 relative to the piston sleeve 220 can be supported. For this purpose, for example, the working pressure in the system of the level control piston 216 and the level control cylinder 218 is increased or decreased, i.e. by inflowing or outflowing hydraulic oil into the recess 223, whereby a corresponding axial adjustment can then be carried out.

Figure 8:
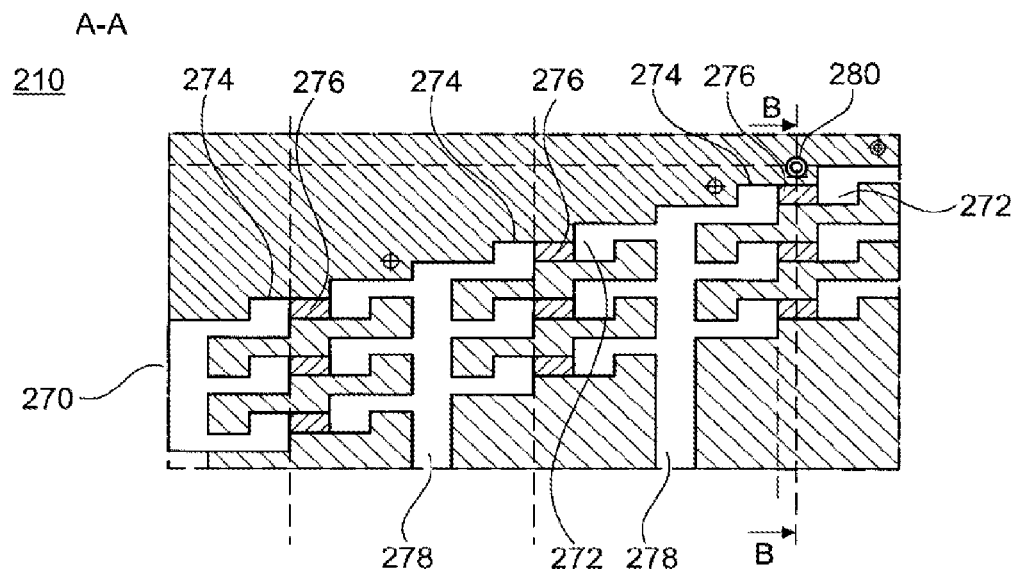
FIG. 8 shows a detailed representation of the system according to FIG. 6 for wear adjustment in the form of a stepped bayonet in a further position.
Figure 9:
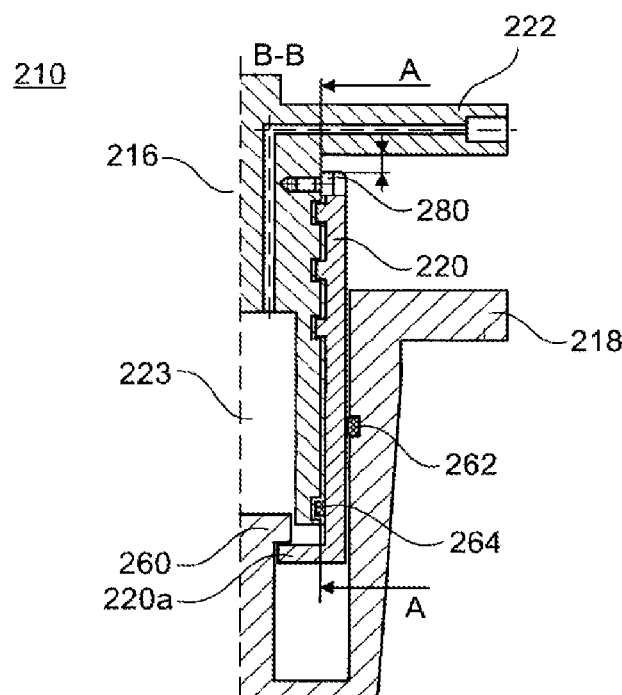
FIG. 9 shows the wear adjustment with a securing screw in connection with the stepped bayonet according to FIG. 8.

In the exemplary case of a bayonet solution, the bayonet studs are located in the bayonet path 278. Since the piston sleeve with the collar 220a is in contact with the stop collar 260, only the piston 216 will be raised. On reaching the next bayonet step, the piston sleeve 220 with the bayonet studs 276 can be turned into the bayonet grooves 274 of the next step (see FIG. 8 and FIG. 9). The hydraulic adjustment or hydraulic support of the readjustment is also conceivable and possible in a comparable form in the exemplary embodiments shown in FIGS. 1 through 4 or other disclosed embodiments.

As further shown in FIG. 7 (section B-B according to FIG. 6), the engaged bayonet step, which corresponds to an adjustment position, can be secured by means of a locking screw 280. Each adjustment position has a corresponding associated screw-in hole for the locking screw 280 (see FIG. 6 and FIG. 8).

REFERENCE CHARACTER LIST

10 Level control system
12 Rail vehicle
14 Level control cylinder module
16 Level control piston
18 Level control cylinder
18a Flange-like section
18b Cylindrical guide surface
18c Axial contact surface
20 Piston sleeve
20a Wall
20b Piston sleeve bottom stop surface
22 Piston base body
23 Recess
24 Chassis
26 Emergency spring
28 Secondary spring
30 Wagon body
34 Hydraulic oil guide channels
34a Horizontal hydraulic oil guide channels
34b Vertical hydraulic oil guide channels
36 Hydraulic connections
38 First section
40 Second section
40a External surface
42 Stop surface
42a Stop surface 44 Counter surface
46 Engagement positions
46a Recess
48 Engagement positions
48a Recess
50 Engagement positions
50a Recess
52 Engagement positions
52a Recess
54 Snap ring
55 Wedge gap
56 Adjustment means
58 Stop pin
60 Stop collar
62 O-ring
64 O-ring
110 Level control system
118 Level control cylinder
118a Protrusion
120 Piston sleeve
120a Stop
210 Level control system
216 Level control piston
218 Level control cylinder
220 Piston sleeve
220a Collar
222 Piston base body
223 Recess
260 Stop collar
262 O-ring
264 O-ring
270 Bayonet system
272 Bayonet steps
274 Bayonet grooves
276 Bayonet studs
278 Guide
280 Lock screw
X Longitudinal axis

The invention claimed is:

1. A level control system for a rail vehicle, the system comprising:
at least one level control cylinder; and
one level control piston,
wherein the level control piston is movably guided in the level control cylinder for adjustment of the level of the rail vehicle,
wherein the level control piston comprises an outer piston sleeve and a piston base body accommodated at least partially in the piston sleeve,
wherein the piston base body is movable relative to the piston sleeve for readjustment and to be established and/or fixed in at least two adjustment positions, and
wherein the level control system further comprises a secondary spring, which is arranged around the level control cylinder and the level control piston, wherein the secondary spring is a coil spring.

2. The level control system of claim 1, wherein the level control cylinder is actuated hydraulically.

3. The level control system of claim 1 wherein the piston base body is continuously displaceable relative to the piston sleeve for wear adjustment.

4. The level control system of claim 1, wherein at least one of the at least two adjustment positions comprises at least one recess.

5. The level control system of claim 1, further comprising at least one retaining ring, at least one locking screw at least one locking pin, at least one bayonet system, at least one spring-loaded ball, at least one magnet, at least one clamping element, or at least one threaded element, which engages in one of the at least two adjustment positions-for fixing the adjustment position relative to the piston sleeve.

6. The level control system of claim 1, further comprising an adjustment screw accommodated or provided in and/or on the piston base body, wherein mechanical adjustment is provided by the adjustment screw located in the piston base body in at least one first position and in at least one second position, wherein by transferring the adjustment screw from the first position to the second position, the piston base body is transferred from one adjustment position of the at least two adjustment positions to another adjustment position of the at least two positions relative to the piston sleeve for readjustment.

7. The level control system of claim 1, wherein the piston base body is axially movable relative to the piston sleeve by applying pressure and/or by reducing pressure.

8. The level control system of claim 1, wherein the piston base body includes a recess, into which hydraulic oil can flow, wherein the inlet is cylindrical or substantially cylindrical.

9. The level control system of claim 8, further comprising a stop pin that protrudes into the recess.

10. The level control system of claim 9, wherein the stop pin comprises a circumferential stop collar has a larger diameter than a central opening of the piston sleeve, which the stop pin passes through in a mounted state.

11. The level control system of claim 8, wherein the level control piston is hydraulic and comprises several hydraulic oil guide channels through which hydraulic oil flows into a sink, wherein the hydraulic oil guide channels are arranged symmetrically relative to each other.

12. The level control system of claim 1, further comprising at least a stroke limiter for a stroke of the level control piston with respect to the level control cylinder, wherein the stroke limiter comprises at least one axial stop.

13. The level control system of claim 1, wherein the level control pistons and the level control cylinder are coaxial.

14. The level control system of claim 1, wherein an adjustment screw that is coaxial with the level control piston and the level control cylinder.

15. The level control system of claim 1, wherein the secondary spring is coaxial with the level control piston and the level control cylinder.

16. The level control system of claim 1, further comprising a connection to a wagon body or a component attached to the wagon body of the rail vehicle, wherein the connection to the wagon body or to the component attached to the wagon body is implemented on the level control piston.

17. The level control system of claim 1, wherein the at least two adjustment positions allows latching and/or locking and/or fixing and/or securing in the respective adjustment position.

* * * * *